United States Patent [19]

Blonski

[11] Patent Number: 4,853,965
[45] Date of Patent: Aug. 1, 1989

[54] FLEXIBLE JOINT MECHANISM

[75] Inventor: Chester J. Blonski, Hamburg, N.Y.

[73] Assignee: The Quaker Oats Company, Chicago, Ill.

[21] Appl. No.: 152,742

[22] Filed: Feb. 5, 1988

[51] Int. Cl.$^4$ .......................... H04R 1/02; F16C 11/06; F16D 1/12; F16M 13/00
[52] U.S. Cl. ..................................... 381/205; 248/160; 248/288.3; 381/169; 403/55; 403/90; 403/123; 403/291
[58] Field of Search ............... 381/169, 168, 188, 205; 403/55, 90, 123, 291; 248/160, 288.3, 288.5

[56] References Cited

U.S. PATENT DOCUMENTS

| 892,105 | 6/1908 | White | 403/90 |
| 1,317,903 | 10/1919 | Whimster | 403/90 |
| 1,333,432 | 3/1920 | Maier | 403/90 |
| 2,185,164 | 12/1939 | Weinreb | 248/288.3 |
| 2,532,173 | 11/1950 | Lewis | 381/169 |
| 2,865,978 | 12/1958 | Modrey | 403/291 |
| 3,278,207 | 10/1966 | Barish et al. | 403/55 |
| 3,324,254 | 6/1967 | Shaw et al. | 381/169 |
| 3,963,037 | 6/1976 | Clark | 403/109 |
| 3,986,692 | 10/1976 | Kinoshita | 248/160 |
| 4,066,231 | 1/1978 | Bahner et al. | 248/288.3 |
| 4,167,354 | 9/1979 | Walker | 403/291 |
| 4,222,680 | 9/1980 | Browning | 403/90 |
| 4,585,197 | 4/1986 | Liautaud et al. | 248/288.5 |
| 4,609,302 | 9/1986 | Kittell | 403/291 |
| 4,767,231 | 8/1988 | Wallis | 403/55 |

FOREIGN PATENT DOCUMENTS 911419  11/1962  United Kingdom ............... 248/160

Primary Examiner—Jin F. Ng
Assistant Examiner—Danita R. Byrd
Attorney, Agent, or Firm—Cumpston & Shaw

[57] ABSTRACT

A flexible joint mechanism comprises male and female joint members for joining a microphone pole to a base member. The male joint member has a substantially spherical end surface. The female joint member has a dish-shaped end surface for receiving the spherical end surface. The dish-shaped and spherical end surfaces are held together in sliding engagement by a spring or the like. A detent is interposed between the dish-shaped and spherical end surfaces for releasably holding the joint members in a vertically aligned position following movement thereof into the aligned position.

17 Claims, 3 Drawing Sheets 4,853,965

FLEXIBLE JOINT MECHANISM

FIELD OF THE INVENTION

The present invention relates generally to flexible joint mechanisms, and more specifically to a flexible joint mechanism for joining a microphone pole to a base member.

BACKGROUND OF THE INVENTION

Children tend to spend a considerable amount of their time indulging in fantasy and in the world of make-believe. To indulge this fantasy, and additionally provide some educational value, the toy industry is challenged to provide toys that closely simulate the real counterparts enjoyed by the adult world.

The use of microphone poles having a microphone secured to the upper end thereof, which is electrically coupled to amplifiers and speaker systems, are well-known in the art. However, a need has existed for some time in the toy industry for a toy microphone-loudspeaker system that simulates an adult microphone-loudspeaker system, but is contained in one unit of simple design and construction. This need has been substantially filled by the toy microphone-speaker system of this invention which essentially comprises a base member containing a battery power source, display lights, and an amplifier and speaker actuable by a depressible foot switch which connects the power to the speaker. The base member further supports a vertically upright microphone pole to which a microphone is attached. The microphone is electrically coupled through the pole to the amplifier and speaker in the base member. To allow the child to move his body while speaking or singing into the microphone, the microphone pole is provided with a flexible joint mechanism adjacent the base of the pole that allows movement of the microphone and pole section attached thereto within a solid conical area relative to the final base member.

Therefore, an object of the present invention is to provide a unitary microphone-speaker assembly having a base member, an upright microphone pole to which a microphone is attached, and a flexible joint mechanism adjacent the lower end of the microphone pole to allow pivotal movement of the microphone and pole through a solid conical area relative to the base member.

SUMMARY OF THE INVENTION

The objects of this invention are accomplished by providing a flexible joint mechanism for joining, for example, a microphone pole to a base member, comprising:

a female joint member having an axis and a substantially dish-shaped end surface;

a male joint member having an axis and a substantially spherical end surface received by the dish-shaped end surface to allow pivotal slidable movement therebetween through a conical area;

resilient means for biasing the female and male joint members together; and detent means interposed between the dish-shaped and spherical end surfaces for releasably holding the joint members with the axes thereof in an aligned position.

In a further object of the present invention, the detent means comprises an annular substantially V-shaped groove in the dish-shaped end surface wherein the V-shaped groove has one face, and a substantially V-shaped projection on the spherical end surface received by the V-shaped groove, wherein the V-shaped projection has one mating surface, and wherein the one face of the V-shaped groove and the one mating surface of the V-shaped projection lie in a plane substantially perpendicular to the axes in an aligned position of the joint members for allowing rotation of one of the female and male joint members relative to the other in the upright position.

A further object of the present invention is to provide a flexible joint mechanism wherein the female joint member comprises a hollow stem member having a flared skirt at one end thereof forming the dish-shaped end surface, and wherein the male joint member comprises a hollow core member having an annular laterally extending plate, and a plurality of axially extending, angularly spaced pie-shaped ribs having edges thereof secured to the plate and core member, the ribs further having and free arcuate edges thereof forming the spherical end surface.

A still further object of the present invention is to provide teeth on each arcuate edge to provide incremental locking adjustment of the female joint member relative to the male joint member in all positions thereof other than the aligned position.

BRIEF DESCRIPTION OF THE DRAWINGS

In the detailed description of the invention presented below, reference is made to the accompanying drawings, in which.

Figure 1:
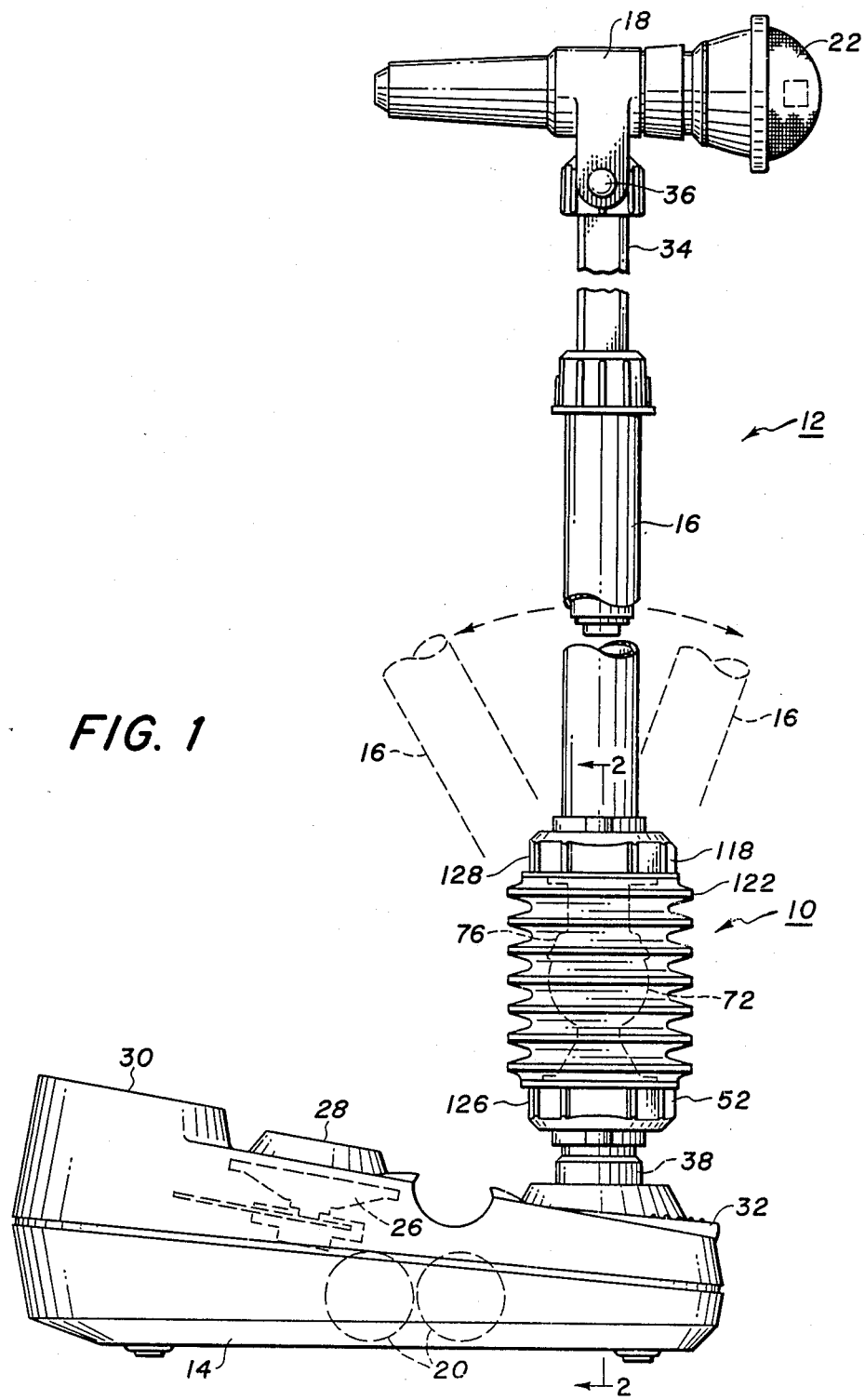
FIG. 1 is a side-elevational view of a preferred embodiment of a microphone-speaker assembly in which the flexible joint mechanism of this invention is embodied.

DETAILED DESCRIPTION OF THE INVENTION:

With reference to FIG. 1, a preferred embodiment of a flexible joint mechanism 10 of this invention is disclosed in a toy microphone-speaker assembly 12 for children. The microphone-speaker assembly essentially comprises a base member 14 mountable on a horizontal surface such as a floor, an upright microphone pole 16 supported by the base member, and a microphone 18 secured to the top of the microphone pole.

The electrical system for the microphone-speaker assembly 12 is powered by batteries 20 in base member 14. Electro-audio signals generated in a mouthpiece 22 of microphone 18 by known means are coupled by electrical wires 24 passing through microphone pole 16 to a speaker 26 mounted on the face of the base member. A knob 28 is provided on base member 14 for controlling the volume of the speaker.

The base member 14 further supports a light cover 30, which is illuminated by a reflected light source, not shown, which is also powered by batteries 20. Switches, not shown, are operated by foot pedals 32, only one of which is shown, for electrically connecting the batteries 20 to the light source and microphone-speaker assembly 12.

The microphone 18 is secured to one end of a rod 34 by a bolt 36, allowing pivotal movement of the microphone relative to the rod, and the opposite end of the rod is slidably mounted within microphone pole 16 to allow vertical adjustment of the microphone and pole relative to base member 14 to conform to the height of the child operator.

The flexible joint mechanism 10 of this invention connects the lower end of microphone pole 16 to base member 14 to allow pivotal movement of the microphone pole to various positions, as seen dotted in FIG. 1, within a solid conically defined area.

Figure 2:
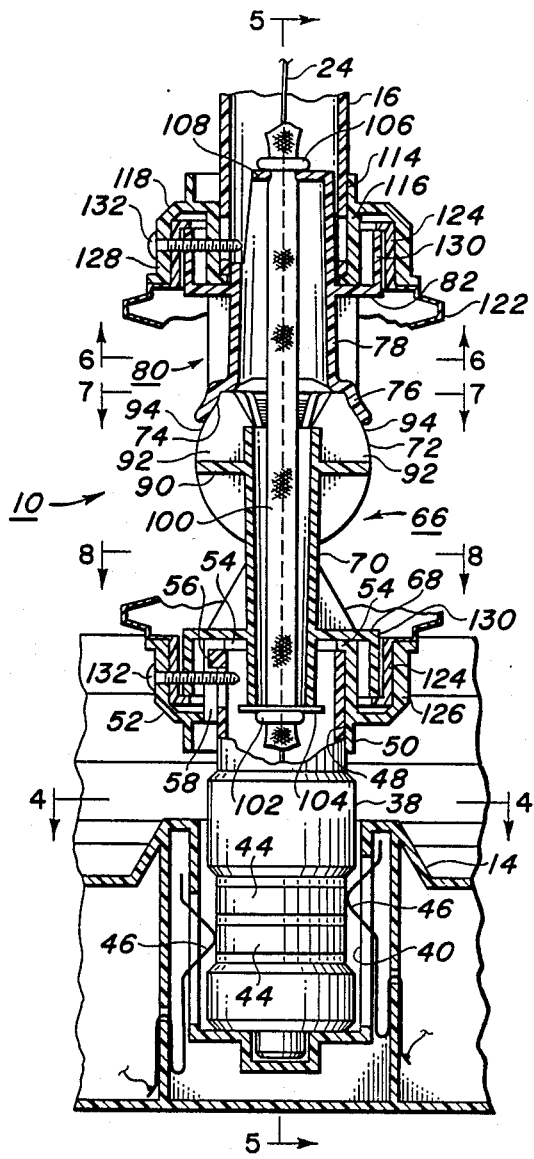
FIG. 2 is an enlarged segmental section view taken substantially along line 2—2 of FIG. 1.
Figure 3:
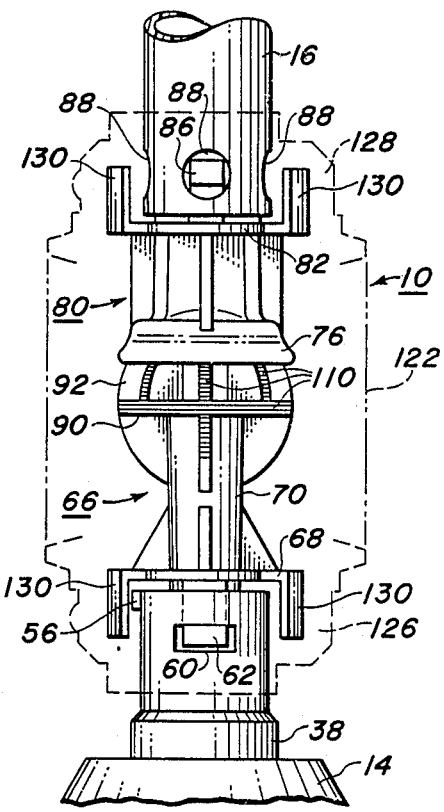
FIG. 3 is a front elevational view of the flexible joint mechanism of FIG. 2 with the parts thereof shown in full lines.
Figure 4:
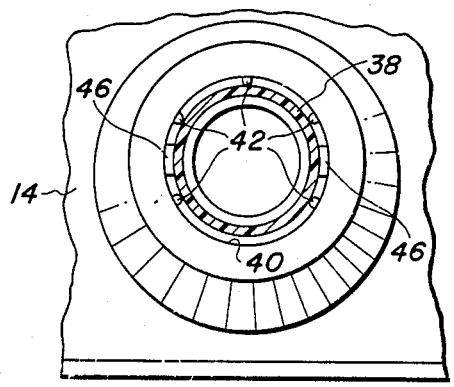
FIG. 4 is a section view taken substantially along line 4—4 of FIG. 2.
Figure 5:
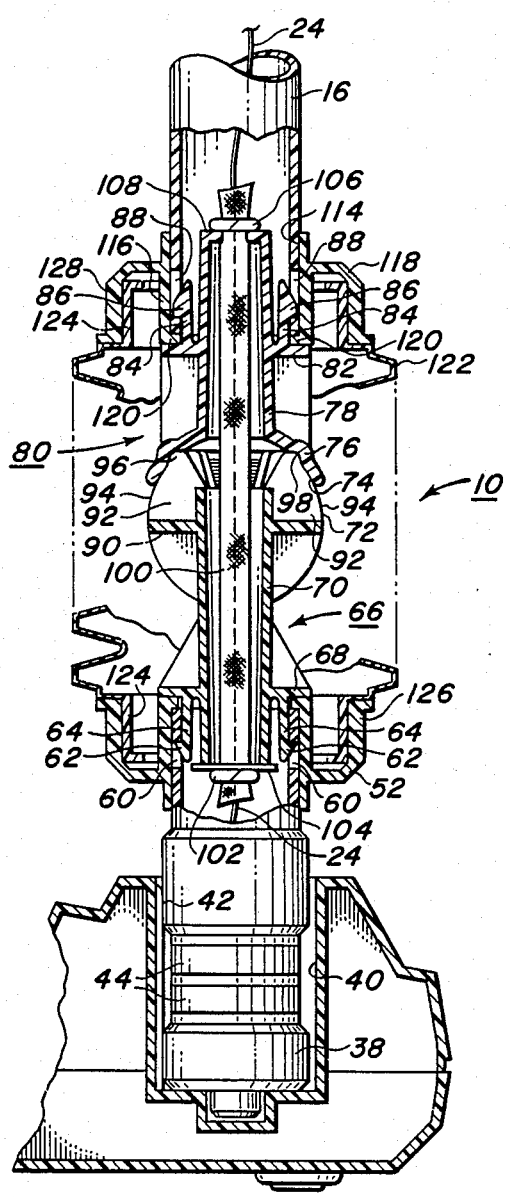
FIG. 5 is a section view taken substantially along line 5—5 of FIG. 2.
Figure 6:
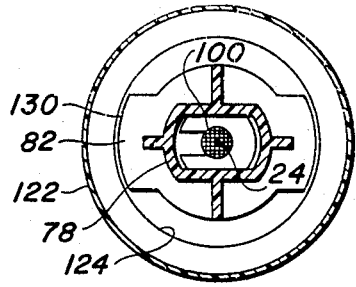
FIG. 6 is a section view taken substantially along line 6—6 of FIG. 2.

With reference to FIGS. 2-9, a connector coupling base member 14 to flexible joint mechanism 10 comprises a cylindrical plug member 38 that is mounted within an upright socket 40 in the base member. The socket 40 is provided with a plurality of upright angularly spaced elongated ribs 42, as best seen in FIGS. 4 and 5, which engage the outer periphery of plug member 38 for guiding the plug member for rotational movement. The plug member 38 has a central portion of reduced diameter for supporting a pair of electrical contact rings 44 which are engagable by spring clips 46 to complete the electrical circuit from the microphone to the speaker, even upon rotatable movement of the microphone 18, joint mechanism 10 and plug member 38 as a unit.

With reference to FIGS. 2, 3 and 5, the upper end of plug member 38 extends through an opening 48 in a cylindrical inner ring 50 in a lower collar 52 and into surface engagement with lips 54, extending radially inwardly from one end of ring 50. The upper end of plug member 38 further has a laterally extending ear 56 that enters a groove 58 in inner ring 50. The upper end of plug member 38 further has opposed substantially rectangular slots 60 (FIGS. 3 and 5) for receiving lugs 62 adjacent the ends of spring fingers 64 for releasably securing plug member 38 to a male joint member 66. The spring fingers depend from a base plate 68 at the lower end of a cylindrical hollow, tapered core portion 70 of male joint member 66. The opposite upper end of core portion 70 of the male joint member has a spherical end surface 72 that is received by a dish-shaped end surface 74 formed by a skirt portion 76 at one end of a hollow stem portion 78 of a female joint member 80. The opposite end of the hollow stem of the female joint member has a plate 82 having upwardly extending spring fingers 84 provided with lugs 86 at the ends thereof insertable into opposed openings 88 at one end of microphone pole 16 for releasably securing the microphone pole to female joint member 80.

The male joint member 66 has an annular laterally extending plate 90 at the spherical end portion 72 thereof. A plurality of axially extending, angularly spaced, pie-shaped ribs 92 have edges thereof secured to plate 90 and core portion 70. Each rib 92 has a free arcuate edge 94, and the edges cooperate with one another to form the spherical end surface 72. A substantially V-shaped projection 96 is formed at the free end of each arcuate edge 94, which projections are received by an annular substantially V-shaped groove 98 in dish-shaped end surface 74 of female joint member 80. The projections 96 and groove 98 form a detent for releasably holding the male and female joint members 66, 80 with the respective axes thereof in a vertically aligned position, in which microphone pole 16 is vertically upright, as seen in FIGS. 1 and 2. In this position, one face of V-shaped groove 98 as well as the mating surface of each projection 96, lies in a plane perpendicular to the aligned axes.

The spherical end surface 72 and dish-shaped end surface 74 are held together by a resilient cord 100 passing through core portion 70 and hollow stem portion 78. A ring 102 secured to the cord engages a washer 104 at one end of the core portion, and another ring 106 on the cord engages a slotted end 108 of hollow stem portion 78. The spacing between rings 102 and 106 when the cord 100 is not stretched is less than the distance between the end portion of core portion 70 and slotted stem end 108. When the upper ring 106 is placed on the slotted stem end, the cord portion between the rings is stretched and tensioned for pressing spherical end surface 72 and dish-shaped end surface 74 into mating engagement. The cord 100 may have a central opening extending from one end to the other through which electrical wires 24 extending from microphone 18 to contact rings 44 can pass.

Figure 7:
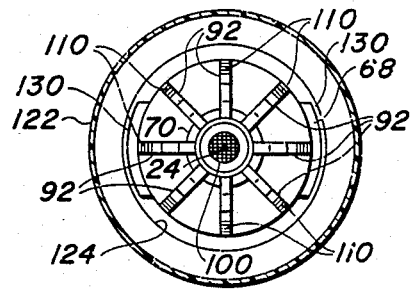
FIG. 7 is a section view taken substantially along line 7—7 of FIG. 2 with the skirt omitted for purposes of clarity.
Figure 8:
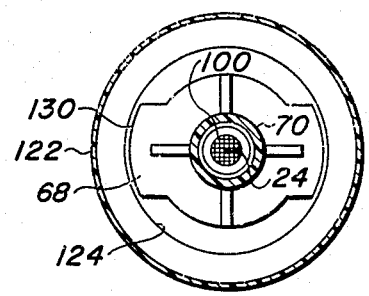
FIG. 8 is a section view taken substantially along line 8—8 of FIG. 2.
Figure 9:
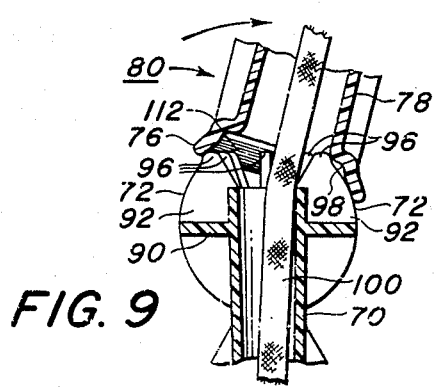
FIG. 9 is a segmental view of a portion of the flexible joint mechanism of FIG. 3 shown in a flexed condition.

When microphone pole 16 is moved to a pivoted or tilted position, as seen in dotted lines in FIG. 1, and skirt portion 76 reaches its outermost position, substantially as seen in FIG. 9, the interaction between projections 96 and the skirt portion is such as to releasably hold the microphone pole in its outermost tilted position. To provide incremental locking adjustment of female joint member 80 relative to male joint member 66 for positions in-between the aligned position and the furthermost non-aligned position, arcuate edges 94 of ribs 92 are provided with teeth 110, as seen in FIGS. 3 and 7, for engaging the mating spherical end surface 72 on skirt portion 76. To further increase the locking adjustment, the spherical end surface of the mating skirt portion can also be provided with mating circular teeth 112 as seen in FIG. 9.

The lower end of microphone pole 16 extends into an opening 114 in inner cylindrical ring 116 of an upper collar 118 and into engagement with radially inwardly extending lips 120 on the end of inner ring 116. A protective cylindrical bellows 122 has a cylindrical end portion 124 at each end thereof insertable into outer rims 126, 128 on collars 52, 118 respectively. The plates 68, 82 of core position 70 and stem portion 78 respectively are provided with laterally extending flanges 130 at each end thereof that are insertable within cylindrical end portions 124 of bellows 122. The collars 52, 118, bellows end portions 124 and flanges 130, may all be secured together by screws 132 or the like, as best seen in FIG. 2.

While a preferred embodiment of the invention has been shown and described with particularity, it will be appreciated that various changes and modifications may suggest themselves to one having ordinary skill in the art, upon being apprised of the present invention. It is intended to encompass all such changes and modifications as fall within the scope and spirit of the appended claims.

What is claimed is:

1. A flexible joint mechanism for joining two parts together comprising:
   a female joint member having an axis and a substantially dish-shaped end surface;
   a male joint member having an axis and a substantially spherical end surface received by the dish-shaped end surface to allow pivotal slidable movement therebetween through a conical area;
   elastic means for biasing the female and male joint members together; and
   detent means interposed between the dish-shaped and spherical end surfaces for releasably holding the joint members with the axes thereof in an aligned position.

2. A flexible joint mechanism according to claim 1, wherein the detent means comprises an annular substantially V-shaped groove in the dish-shaped end surface, and a substantially V-shaped projection on the spherical end surface received by the V-shaped groove.

3. A flexible joint mechanism according to claim 2 wherein the V-shaped groove has one face and the V-shaped projection has one mating surface, and wherein the one face of the V-shaped groove and the one mating surface of the V-shaped projection lie in a plane perpendicular to the aligned axes when the joint members are in the aligned position for allowing rotation of one of the female and male joint members relative to the other in the aligned position.

4. A flexible joint mechanism according to claim 2, wherein the female joint member comprises a hollow stem member having a flared skirt at one end thereof forming said dish-shaped end surface, and wherein the male joint member comprises a hollow core member having an annular laterally extending plate, and a plurality of axially extending, angularly spaced pie-shaped ribs having edges thereof secured to the plate and core member, the ribs further having free arcuate edges thereof forming the spherical end surface.

5. A flexible joint mechanism according to claim 4, wherein each free arcuate edge has a V-shaped projection, wherein the V-shaped groove has one face and the V-shaped projection has one mating surface, wherein the one face is at the junction of the skirt and stem, and wherein the one mating surface is at one end of each arcuate edge.

6. A flexible joint mechanism according to claim 5, wherein teeth are provided on each arcuate edge to provide incremental locking adjustment of the female joint member relative to the male joint member.

7. A flexible joint mechanism according to claim 5, wherein the elastic means comprises an elastic cord passing through the hollow stem and core members, wherein a first ring is secured to the cord for engaging one end of the stem member, wherein a second ring is secured to the cord for engaging one end of the core member, and wherein the spacing between the rings when the elastic cord is unstretched is less than the spacing between the one end of the stem member and the one end of the core member whereby the cord is stretched and tensioned for biasing the dish-shaped and spherical end surfaces together.

8. A flexible joint mechanism for a unitary microphone-speaker assembly for joining a microphone pole to a horizontal base member for allowing pivotal movement of the microphone pole relative to the base member, comprising:
   a vertical socket in the base member;
   a hollow male joint member having an axis and having one end coupled to the plug member and its opposite end provided with a substantially spherical end surface;
   a hollow female joint member having an axis and having a dish-shaped end surface at one end for slidably receiving the spherical end surface over a contact surface, the opposite end of the female joint member being connected to the microphone pole; and
   elastic means for biasing the dish-shaped and spherical end surfaces together in sliding engagement.

9. A flexible joint mechanism according to claim 8, wherein detent means are interposed between the dish-shaped and spherical end surfaces for releasably holding the male and female joint members with the axes thereof in a vertically aligned position when the microphone pole is moved into a vertical position.

10. A flexible joint mechanism according to claim 9, wherein the detent means comprises an annular substantially V-shaped groove in the dish-shaped end surface, and a substantially V-shaped projection on the spherical end surface received by the V-shaped groove.

11. A flexible joint mechanism according to claim 10, wherein the V-shaped groove has one face and the V-shaped projection has one mating surface, and wherein the one face of the V-shaped groove and the one mating surface of the V-shaped projection lie in a plane perpendicular to the axis in the aligned position of the joint members for allowing rotation of one of the female and male joint members relative to the other.

12. A flexible joint mechanism according to claim 11 wherein the male joint member comprises a hollow core member having an annular laterally extending plate, and wherein a plurality of axially extending, angularly spaced pie-shaped ribs have edges thereof secured to the plate and core member, the ribs further having free arcuate edges thereof forming the spherical end surface and wherein the female joint member comprises a hollow stem member having a flared skirt at one end thereof forming the dish-shaped end surface.

13. A flexible joint mechanism according to claim 12 wherein each free arcuate edge has a V-shaped projection, wherein the V-shaped groove has one face and the V-shaped projection has one mating surface, wherein the one face is at the junction of the skirt and stem, and wherein the one mating surface is at one end of each arcuate edge.

14. A flexible joint mechanism according to claim 13, wherein teeth are provided on each arcuate edge to provide incremental locking adjustment of the female joint member relative to the male joint member.

15. A flexible joint mechanism according to claim 14, wherein the elastic means comprises an elastic cord passing through the hollow stem member and core member, wherein a first ring is secured to the cord for engaging one end of the stem member, wherein a second ring is secured to the cord for engaging one end of the core member, and wherein the spacing between the rings when the cord is unstretched is less than the spacing between the one end of the stem member and the one end of the core member whereby the cord is stretched and tensioned for biasing the dish-shaped and spherical end surfaces together.

16. A flexible joint mechanism according to claim 15, wherein a flexible cylindrical hollow bellows encircles the male and female joint members, the bellows having one end connected to one end of the male joint member and its opposite end connected to the opposite end of the female joint member.

17. A flexible joint mechanism according to claim 15, wherein a speaker is mounted within the base member, and wherein means are provided for electrically coupling the microphone to the speaker, the electrical coupling means comprising a pair of spaced contact rings on the play member electrically connected to the microphone, and a pair of spring clips on the base member electrically connected to the speaker and spring biased into engagement with the contact rings.

* * * * *